United States Patent [19]

Witte

[11] Patent Number: 4,572,028

[45] Date of Patent: Feb. 25, 1986

[54] CONTINUOUSLY VARIABLE GEAR DEVICE

[75] Inventor: Horst Witte, Wiesbaden, Fed. Rep. of Germany

[73] Assignee: Hoechst Aktiengesellschaft, Frankfurt am Main, Fed. Rep. of Germany

[21] Appl. No.: 487,302

[22] Filed: Apr. 21, 1983

[30] Foreign Application Priority Data

May 3, 1982 [DE] Fed. Rep. of Germany ....... 3216459

[51] Int. Cl.$^4$ .................. F16H 35/08; G05G 1/04
[52] U.S. Cl. .................................... 74/828; 74/833; 74/89.2; 74/108; 74/522; 74/110
[58] Field of Search .................. 74/89.2, 89.21, 89.22, 74/108, 110, 516, 517, 518, 522, 828, 833, 834, 831

[56] References Cited

U.S. PATENT DOCUMENTS

| | | | |
|---|---|---|---|
| 1,890,623 | 12/1932 | Scott | 74/516 |
| 3,043,156 | 7/1962 | Hannon | 74/522 |
| 3,439,555 | 4/1969 | Rech | 74/108 |

FOREIGN PATENT DOCUMENTS

| | | | |
|---|---|---|---|
| 715170 | 12/1941 | Fed. Rep. of Germany | 74/108 |
| 1039777 | 10/1953 | France | 74/110 |
| 621078 | 4/1949 | United Kingdom | 74/516 |
| 630207 | 11/1978 | U.S.S.R. | 74/108 |

OTHER PUBLICATIONS

Mechanisms, Linkages & Mechanical Controls, "10 Ways to Change Straight-Line Direction," Strasser, p. 80.
Mechanisms, Linkages & Mechanical Controls, "Linkages for Accelerating & Decelerating Linear Strokes" Hyler, p. 70.

Primary Examiner—Lawrence J. Staab
Attorney, Agent, or Firm—Schwartz, Jeffery, Schwaab, Mack, Blumenthal & Evans

[57] ABSTRACT

The present invention pertains to a continuously variable gear device for converting a rotary motion into a linear motion which is dependent on the angle of rotation. The gear device comprises a swivel arm which is rotatable about a fulcrum and is attached to a guide structure on the input and output sides, respectively, of the gear device. Each guide structure is provided with a sliding member to which strings are attached. The swivel arm has guide slots formed on either side of the fulcrum and each guide structure has a roller bearing which engages one of the slots. The mutual distance between the two guide structures is adjustable, by moving one of the guide structures along a positioning rail to vary the transmission ratio of the device.

14 Claims, 4 Drawing Figures

CONTINUOUSLY VARIABLE GEAR DEVICE

BACKGROUND OF THE INVENTION

1. Field of the Invention

The present invention relates to a continuously variable gear device for converting a rotary motion into a linear motion which is dependent on the angle of rotation.

2. Discussion of Related Art

For some purposes, gear devices are necessary for changing a rotary input motion into a linearly proportional output motion, i.e. a straight-line movement, wherein the transmission ratio of the device is continuously variable with respect to the rotary input motion.

According to the known state of the art, this object can be achieved by connecting the rotary motion, for example, to a stepped gear device, the output end of which is connected to a continuously variable transmission. The transmission has a range which covers the stepwise progression of the first gear device and thus linearizes the output motion.

When producing electrophotographic copies from microfilms, i.e. in the field of microfilm re-enlargement, the photoconductor web onto which the enlarged film images are reproduced slit-wise has a given operating speed. It is necessary to produce a corresponding, slower linear scanning speed for the microfilm aperture card, which is to be used for projection, by means of a rotary transfer. The linear scanning speed should be slower than the operating speed of the photoconductor web by a factor ranging from 6 to 36, particularly from 7.4 to 29.6. It is obvious that, in the re-enlargement of microfilms, the accuracy of transfer is affected by the number and quality of transfer elements used to convert the rotary speed into a linear output speed. This is particularly true since inaccuracies of the individual transfer elements may accumulate in practice and cause maximum deviations which, in total, exceed the admissible tolerance limit. It may thus occur that the resulting transmission ratio yields microfilm re-enlargements which cannot be satisfactorily reproduced. By means of the stepped gear devices which can be used in the field of microfilm re-enlargement, a stepped transmission of re-enlargement factors is effected by appropriately choosing pairs of gear wheels, so that re-enlargements corresponding to standard format series, for example DIN sizes, are obtained. Owing to the precision required of the gear-wheel pairs used, such stepped transmission gears are very expensive.

Stepped transmission gears of this kind can be constructed according to the prior art, as described, for example, in "Getriebebeispiel-Atlas" (Atlas of Gear-Unit Examples), K. Hain, VDI-Verlag, Duesseldorf, 1973. These stepped transmission gears allow the production of re-enlargements which correspond to given format series. The methods of converting a rotary motion into a linear motion described in this atlas are very complicated and meet, at the most, two of the three aforementioned requirements. Also in the constructions according to which the straight-line output motion is continuously variable, it appears that the transmission ratio cannot be maintained with mathematical accuracy along the entire operating path, i.e. the proportionality factor between the input and output motions changes.

SUMMARY OF THE PRESENT INVENTION

It is an object of the present invention to provide a continuously variable gear device which, in addition to enabling a stepwise change to be made to accommodate different formats in a format series, makes it possible to obtain a continuous change of transmission factors.

Another object of the present invention is to provide a continuously variable gear device in which the proportionality factor between the input and output is accurately maintained throughout the entire operating path.

A further object of the present invention is to provide a continuously variable gear device which is relatively simple in design yet durable and accurate in use.

In accordance with the above and other objects, the present invention is a continuously variable mechanism for converting rotary motion into linear motion dependent on the angle of rotation of said rotary motion, comprising means for converting rotary motion into a straight line motion and means for changing the stroke of said straight line motion. The stroke changing means includes a fulcrum and a swivel arm connected to pivot about the fulcrum. The swivel arm has two ends, a first one of the ends being an input end, the other of the ends being an output end of said mechanism. An input guide is connected to the input end for moving the input end in response to the straight line motion, whereby the swivel arm pivots about the fulcrum.

The converting means may comprise an elongated flexible member having one end connected to move with the rotary motion and having a second end positioned to move in a straight line in response to movement of the one end.

The input guide means may comprise a guide member and a slide mounted on the guide member to move linearly along the guide member. The slide is connected to the second end of the elongated flexible member.

An output guide means may be connected to the other of the swivel arm ends to produce straight line motion in response to movement of the first swivel arm end. The output guide means also comprises a slide and a guide member, with the slide being mounted for linear movement along the guide member. An elongated flexible member may be connected to the slide for movement in response to the slide.

The input guide means and the output guide means each comprises a slot formed in the swivel arm. The slots are formed on opposite sides of the fulcrum and a bearing surface is disposed in each slot.

Means are also provided for varying the distance between the input and output guide means to vary the ratio of the input motion to the output motion.

BRIEF DESCRIPTION OF THE DRAWINGS

In the text which follows, the invention is explained in greater detail, reference being had to the drawings in which like reference numerals represent like parts throughout and in which.

DESCRIPTION OF THE PREFERRED EMBODIMENT

Figure 1:
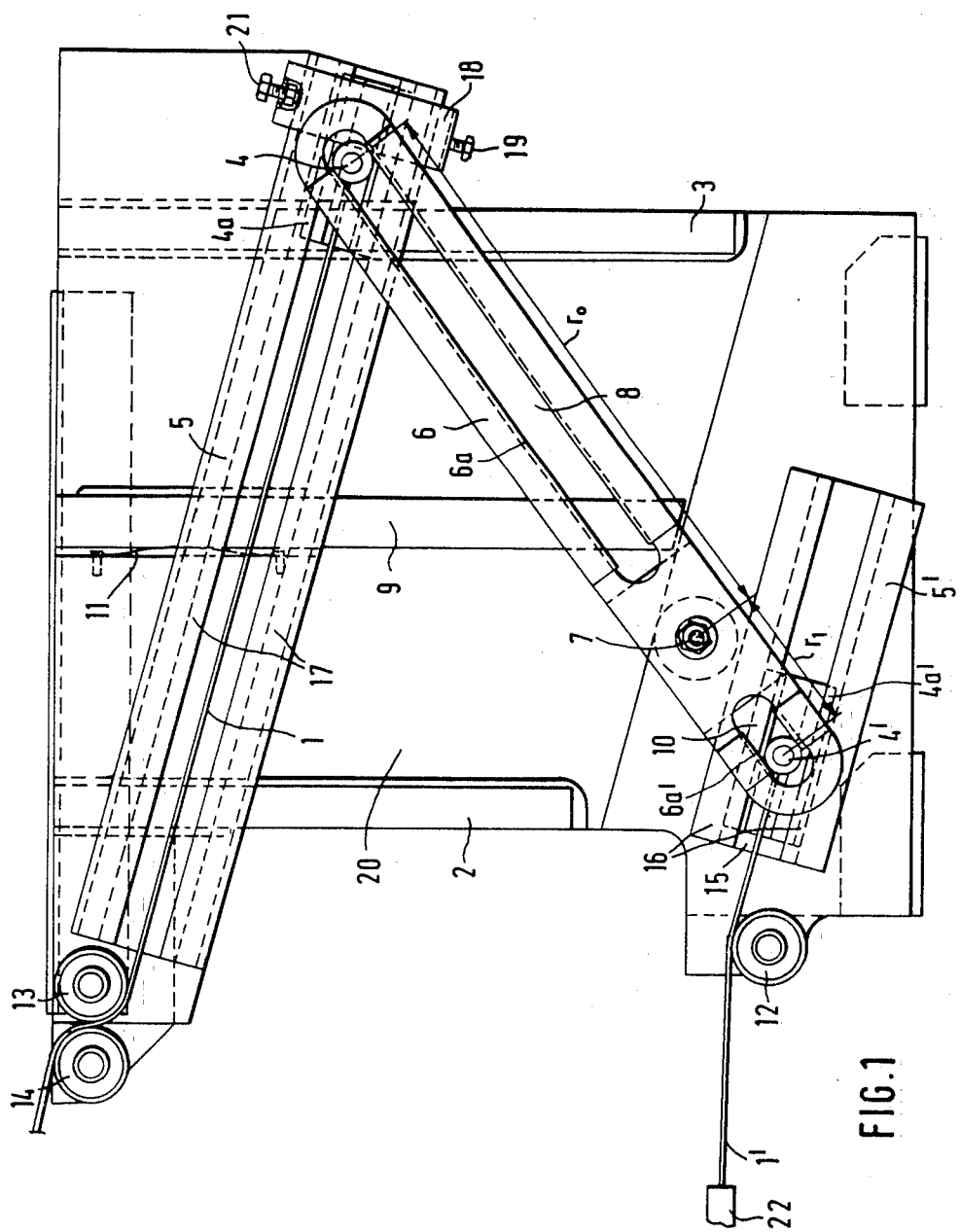
FIG. 1 is a side elevational view of a gear device according to the present invention in a first position.

Before entering into a detailed description of the gear device shown in the drawings, its application in the re-enlargement of microfilms will be briefly explained.

When the gear device is used for re-enlarging microfilm aperture cards to copy sizes of a standard series, such as DIN sizes, the generally employed re-enlargement factors are 7.4, 10.5, 14.8, 21 and 29.6. These re-enlargement factors can be written as the products of $(\sqrt{2})^n \times (7.4)$. For n=0 to 4 the multiples of $(\sqrt{2})^n$ are 1, $\sqrt{2}$, 2, $2\sqrt{2}$ and 4. The problem of re-enlargement is thus simplified in that the common enlargement factor 7.4 can be taken into account in the design of a common drive transmission. This can be done, for example, by converting the input circumferential movement of a photoconductor drum onto which the microfilm aperture card is to be projected into a linear motion which is then reduced by the factor of 7.4 by means of gear wheels, gear chains, or the like. The linear motion is converted into a pulling force on the input side of the gear device by the use of string or the like. The gear device has a variable transmission ratio within the range from 1 to 4 and thus performs the functions of a combined stepped gear device and a continuously variable auxiliary gear device. The constant-speed linear motion derived from the rotary motion is thus used to produce another constant-speed linear motion, at 1 to 0.25 times the speed of the former.

During exposure or projection, respectively, of the microfilm aperture card onto the photoconductor drum, the aperture card moves at constant speed over a distance of not more than about 40 mm or at least about 14 mm, depending on the format of the drawing recorded on the microfilm. This format usually varies from DIN A0 to DIN A4. In the process, the magnitude of the constant speed varies between 25 mm/s and 6.25 mm/s, depending on the re-enlargement factor chosen between 7.4 and 29.6 and the given photoconductor speed.

The gear device shown in FIG. 1 comprises a swivel arm 6 which is rotatable about a fulcrum 7. The fulcrum 7 divides the swivel arm 6 into two lever arms which contact roller bearings 4 and 4', respectively at different distances from the fulcrum. On the input and output sides of the gear device, the swivel arm 6 is, in each case, slidingly guided along guide structures 5 and 5', respectively, by means of sliding members 4a and 4a' which are attached to the roller bearings 4 and 4'. The sliding member 4a moves in the guide structure 5 on the input side of the gear device and is in rolling contact with the roller bearing 4 in the guideway 6a, and the sliding member 4a' moves in the guide structure 5' on the output side of the gear device and is in rolling contact with the roller bearing 4' in the guideway 6a'. On the input side, a rope or string 1, is passed between two deviating rollers 13 and 14 and is led through the guide structure 5 up to the sliding member 4a to which it is attached. The guide structure 5 comprises two guide rails 17 which are maintained at a particular distance with respect to each other. A stop 18 is attached to the guide structure 5 at its end opposite to the deviating rollers 13 and 14. The stop 18 is displaceable along the guide rails 17 of the guide structure 5 and is locked in the desired position, for example, by means of two adjusting screws 19 and 21. It is, of course, also possible for the stop 18 to be attached to the guide rails 17 in a fixed position.

Figure 4:
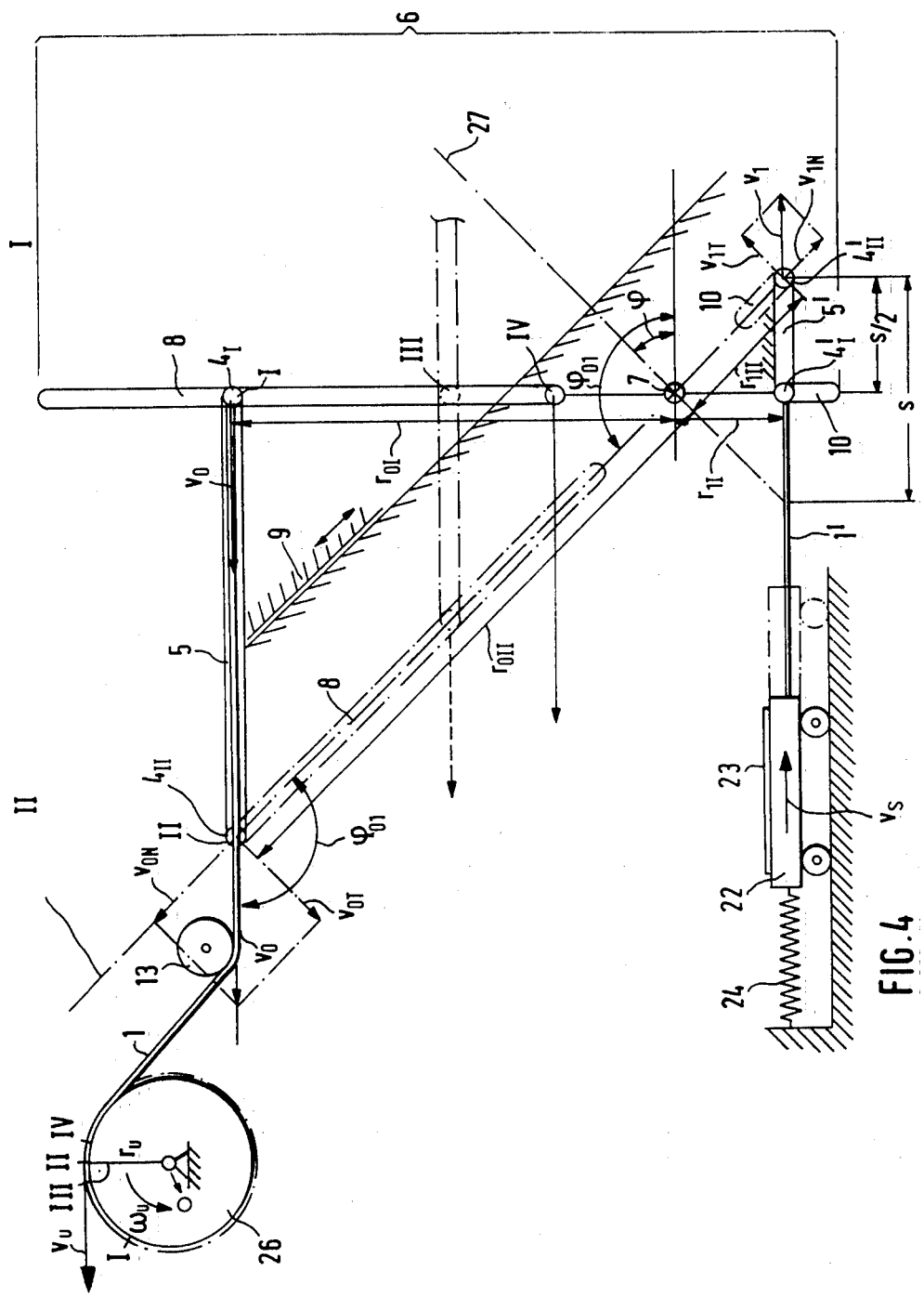
FIG. 4 is a kinematic representation of the gear device.

The rope or string 1 is rolled up at a predetermined speed by means of a pulley which is fastened to a coupling armature disk. The pulley and the coupling armature disk are not shown in FIG. 1. Downstream of the deviating roller 13, the string 1 moves the sliding member 4a with the roller bearing 4 at this predetermined speed within the guide structure 5. At the same time, the roller bearing 4 rotates the swivel arm 6 about its fulcrum 7 so that is is shifted from its initial position into a position as indicated, for example, by position II in FIG. 4. Instead of a sliding member 4a, the guide structure 5 on the input side of the gear device may comprise a member having roller bearings which are mounted free from play with the string 1 being attached to this member. Similarly, it is possible to provide a pivotally mounted sliding element in lieu of the bearing 4. Rotation of the swivel arm 6 is effected by a tangential component of speed, the normal speed component being involved in the longitudinal guiding of the swivel arm 6. A detailed description of this procedure is given below, with reference to FIG. 4. A corresponding division of speed components also occurs on the output side of the gear device, where one end of a string 1' is fastened to the sliding member 4a', while its other end is connected with a displaceable sliding carriage, which is shown in FIG. 4 in a symbolic representation as a wheeled carriage 22. A microfilm aperture card 23 for re-enlargement lies on this displaceable carriage 22. By means of the string 1', the carriage 22 is moved to the right, against the pulling force of a spring 24 which acts on its end opposite to the string 1'. FIG. 1 shows only the outlines of the carriage 22 with the rope 1' attached thereto.

The guide structure 5' on the output side of the gear device is shorter than the guide structure on the input side, but has a similar construction. It comprises two guide rails 16 which are spaced a predetermined distance from each other and define the guideway of the sliding member 4a'. A guide plate 15 of the guide structure 5' may serve as a stop for the sliding member 4a' and may be stationarily mounted, contrary to the stop 18 on the input side. It is, however, not necessary to have a stop in either case. The string 1' is guided around a deviating roller 12 which is mounted on a base plate 20 of the gear device exactly as the deviating roller 14 on the input side.

Instead of the sliding member 4a', a member comprising roller bearings mounted free from play, to which the string 1' is attached, may also be provided in the guide structure 5'.

The swivel arm 6 has two slots 8 and 10, formed, respectively, on either side of the fulcrum 7. These slots are equipped with guideways 6a and 6a' which are engaged by the roller bearings 4 and 4', respectively.

The guide structure 5 can be displaced along a central positioning rail 9 so that the mutual distance between the two guide structures 5 and 5' is adjustable. The guide structure 5 is locked in its respective position on the positioning rail 9 by a leaf spring 11. Additional positioning rails 2 and 3, on which the guide structure 5 slides in the adjusting procedure are mounted at the edges of the base plate 20.

Figure 2:
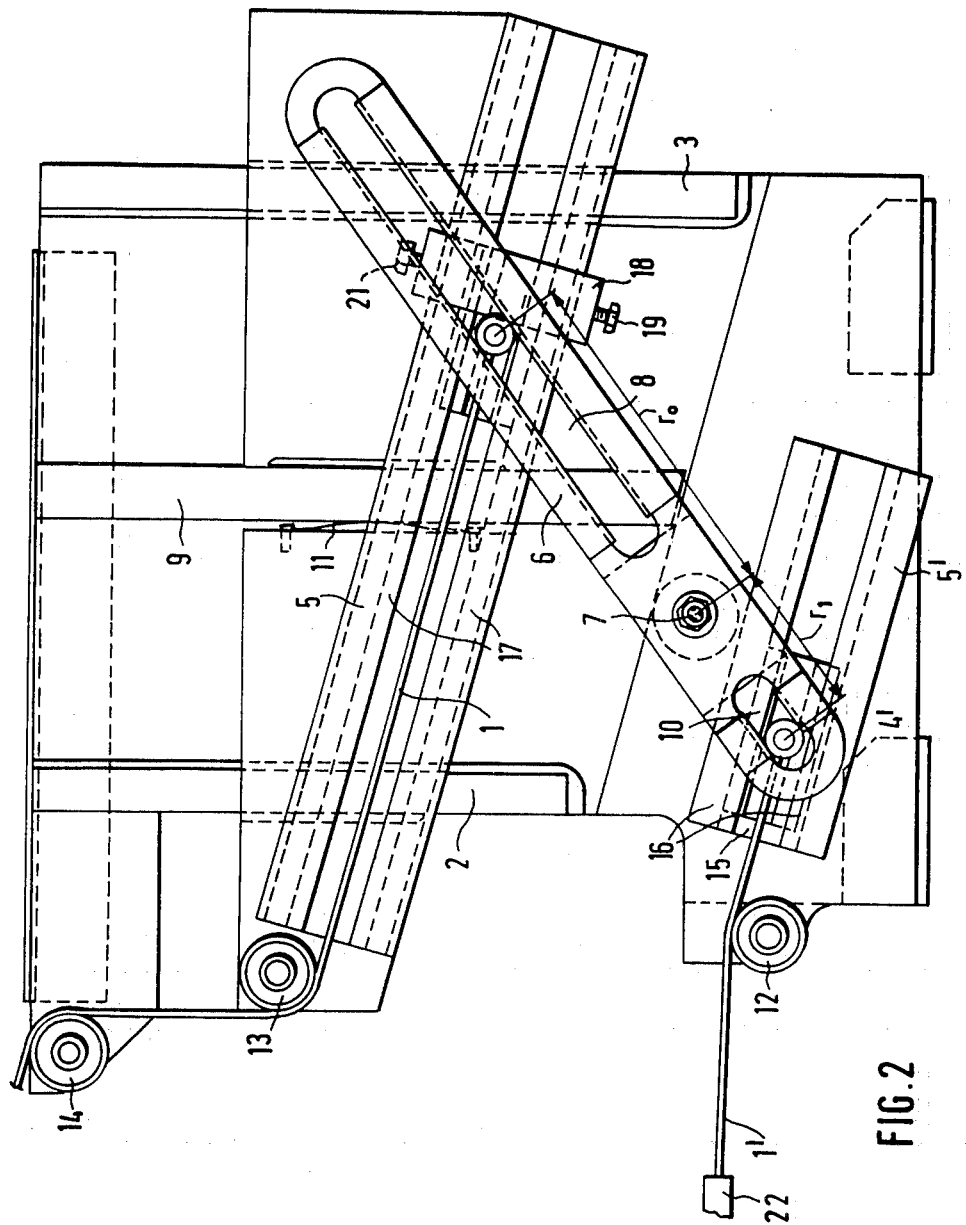
FIG. 2 is a side elevational view of the gear device, in a second position.

FIG. 2 depicts a lateral view of the gear device in which the position of guide structure 5 has been changed, as compared to FIG. 1, to produce a shorter distance between the guide structure 5 and 5'. When the position is changed, the transmission ratio is linearly proportional to the distance from the fulcrum 7.

The distance $r_o$ is variable and is measured between the fulcrum 7 of the swivel arm 6 and the roller bearing 4 on the input side. The distance $r_1$ is also variable and is measured between the fulcrum 7 and the roller bearing 4' on the output side. The constant ratio of these distances $r_1:r_o$, which correspond to the lengths of the lever arm in any position of the swivel arm 6 constitutes the constant transmission ratio of the gear device in any position of the swivel arm 6.

Figure 3:
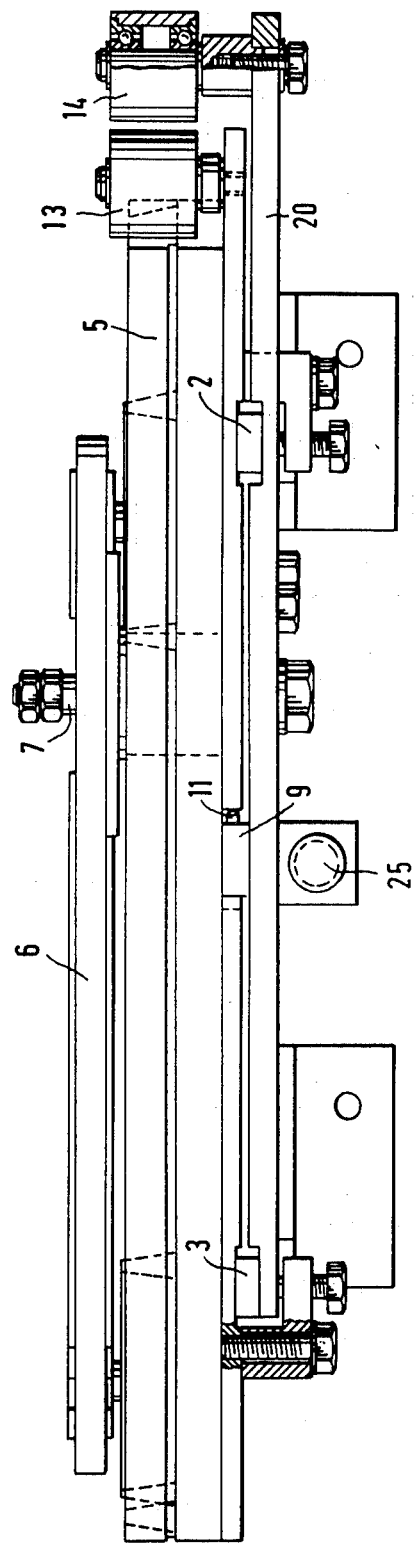
FIG. 3 is a plan view of the device of the present invention in the position according to FIG. 1.

FIG. 3 is a plan view of the gear device according to FIG. 1. It shows a spindle 25 on the underside of the base plate 20 which serves to displace the guide structure 5 of the input side with respect to the guide structure 5', via struts which are not shown.

With reference to FIG. 4, which shows the kinematics of the gear device, the mode of operation of the gear device and the lines of action of gear movement will now be described. For reasons of clarity it is first assumed that the swivel arm 6 is in a position I which is normal to the horizontal line and that the swivel arm 6 is rotated about its fulcrum 7 from this position I into a position II.

The rope or string 1 on the input side is wound up at a speed $v_u$ by means of a pulley 26, which is fastened to a coupling armature disk which is not shown. Downstream of the deviating roller 13, the string 1 moves the roller bearing 4 in the guide structure 5, at a speed $v_o = v_u$. In the process, the roller bearing 4 rotates the swivel arm 6 about the fulcrum 7 from its position I into a position II. The positions I and II of the roller bearing are marked by the indices I and II affixed to the reference numeral 4, to read $4_I$ and $4_{II}$.

According to the vector representation in the position II of the roller bearing 4, rotation of the swivel arm 6 is effected by the tangential component $V_{OT}$ of the speed $v_o$, while the normal component $V_{ON}$ of the speed $v_o$ proceeds in the longitudinal direction of the swivel arm 6 and has no influence upon rotation. A corresponding division of speed which takes place on the output side of the swivel arm 6 is represented by the speed $v_1$ and its components $v_{1T}$ and $v_{1N}$.

Since a steadily decreasing portion of the constant driving speed $v_o$ is used for rotation and, in addition, the length of the lever arm $r_{oII}$ is steadily increased, as viewed over the path of motion of the roller bearing 4, the swivel arm 6 rotates at a steadily decreasing angular speed $\omega_o$.

For reasons of symmetry, a corresponding process occurs on the output side, i.e. the lever arm $r_{1II}$ between the fulcrum 7 and the roller bearing 4' moving into its position II increases steadily and, consequently, the ratio between these parameters is exactly constant at any time of movement of the gear device and the output speed thus remains constant at a constant input speed.

As can be seen from FIGS. 1 and 2, the initial position of the swivel arm 6 is not normal to the horizontal line, as shown in the kinematic representation. Instead, the swivel arm 6 is inclined at an angle $\phi = 45°$, as indicated by the dash-dotted line 27, in FIG. 4.

As a result of this position, the possible distance of displacement s/2 of the sliding carriage 22 which is connected to the sliding member $4a'$ via the string 1', is doubled to the value s, for example, to s=40 mm. In position II, the swivel arm 6 then includes an angle $\phi_{01} = 135°$ with the horizontal line. Below, the speed ratios are given, which exist on the input and output sides at any time during movement. The indices I and II denote the positions I and II in FIG. 4.

The following applies for the input side:

$$\omega_0 = \omega_1, \phi_0 = \phi_1, \quad (1)$$

$$\frac{r_{1II}}{r_{0II}} = \frac{r_{1I}}{r_{0I}}$$

$$v_u = \omega_u r_u \quad (2)$$

$$v_u = v_0 = \frac{v_{0T}}{\sin\phi_0} = \frac{\omega_0 r_{0II}}{\sin\phi_0} \quad (3)$$

For the output side, the following relationships apply: $v_s = v_1$, $v_1 = \omega_1 r_{1II}$ and with equations (1) and (3)

$$v_s = \frac{v_{1T}}{\sin\phi_1} = \frac{\omega_1 r_{1II}}{\sin\phi_1} = \frac{\omega_0 r_{1I}}{\sin\phi_0 r_{0I}} r_{0II}$$

$$v_s = \frac{v_{0T}}{\sin\phi_0} \cdot \frac{r_{1I}}{r_{0I}} \quad (4)$$

$$v_s = v_u \frac{r_{1I}}{r_{0I}} = \omega_u r_u \frac{r_{1I}}{r_{0I}} = \text{const. } \omega_u \quad (5)$$

From equation (5) it can be seen that the output speed $v_s$ for the sliding carriage 22 is proportional to the angular speed $\omega_u$ of the pulley 26 and that the output speed $v_s$ is, at any time, the product of a constant factor $r_{1I}/r_{0I}$ and the input speed $v_u$, respectively.

In an illustrative example $r_{1I} = 20$ mm and $r_{0I} = 80$ mm. Using these values, equation (5) gives the following result for the output speed $$v_s = \tfrac{1}{4} v_u.$$

By means of the positioning rail 9, the guide structure 5 can be displaced in a parallel manner through a position III up to a position IV and even further, and can be locked in any position. In FIG. 4, the possible displacement along the positioning rail 9 is indicated by dashes; the positioning rail 9 is represented by its line of action. The transmission ratio is linearly proportional to the position of the rail and is, for example, equal to 1 in position IV.

Within the predetermined adjusting range, an accurate output speed $v_s$ can be produced in accordance with specified input conditions and the transmission ratio can be maintained with a high degree of accuracy throughout the entire stroke.

It is thus possible to transport the microfilm aperture card 23 on the sliding carriage 22 in accordance with the re-enlargement factor chosen in each case.

FIG. 4 also shows that changes of the tangential force and angular speed on the input side are compensated for on the opposite output side, so that the requirements for a uniform scanning of the microfilm aperture card 23 are met.

To sum up, it can be said that by means of the continuously variable gear device of the present invention, a rotary motion can be converted into a straight-line movement which is dependent on the angle of rotation, the ratio between the angular speed and the corresponding linear speed being constant with mathematical accuracy within the adjusting range and that by a stepless adjustment of the guide structure 5, a different constant ratio can be selected. For this purpose, it is only necessary to convert the rotary motion into a linear motion in a known manner and then set up the ratio of two linear motions, using the swivel arm 6 of the gear device. In the process, the linear driving motion is applied to the first lever on the swivel arm 6, in such a way that it acts perpendicularly on the lever in a reference position and maintains its direction of action and magnitude in adjacent positions, independently of the angular variation of the lever arm. Identical processes take place on the output side, corresponding to the ratio of the lever arms. Within the adjusting range, the angular speed and the effective lengths of the lever arms change constantly. In order to adjust the device to a different constant ratio between the input and output speeds, a parallel shift of the direction of action of one of the two linear motions is effected.

The foregoing description is set forth for the purpose of illustrating the present invention but is not meant to be limiting in any way. Clearly, numerous modifications can be made by one of ordinary skill in the art without departing from the scope of the invention as set forth in the appended claims.

What is claimed is:

1. A continuously variable gear mechanism for converting rotary motion into linear motion dependent on the angle of rotation, comprising:
    means for converting rotary motion into a straight line motion;
    means for changing the stroke of said straight line motion comprising a fulcrum, a swivel arm connected to pivot about said fulcrum, said fulcrum dividing said swivel arm into two lever arms of different lengths, each lever arm having an end, a first one of said ends being an input end, the second of said ends being an output end, input guide means connected to said first end for moving said first end in response to said straight line motion, whereby said swivel arm pivots about said fulcrum, and output guide means connected to said second end for moving said second end and producing said straight line motion; and
    means for changing the distance on said swivel arm between said input guide means and said output guide means.

2. A continuously variable gear mechanism for converting rotary motion into linear motion according to claim 1, wherein said converting means comprises an elongated flexible member having a first end connected to move in said rotary motion and having a second end positioned to move in a straight line in response to movement of said first end, and wherein said input guide means comprises an input guide member and an input slide member mounted on said input guide member to move linearly along said input guide member, said input slide member being connected to said second end of said elongated flexible member.

3. A continuously variable gear mechanism for converting rotary motion into linear motion according to claim 2, wherein said input guide means further comprises a bearing member attached to said input slide member and connected to said swivel arm for pulling said swivel arm in response to movement of said input slide member.

4. A continuously variable gear mechanism for converting rotary motion into linear motion according to claim 1, wherein said input guide means comprises a roller bearing and said converting means comprises an elongated flexible member having first and second ends, said elongated flexible member being connected at said first end to move in said rotary motion and being connected at said second end to said roller bearing, said roller bearing being positioned against said first end of said swivel arm to pull said swivel arm in response to movement of said elongated flexible member.

5. A continuously variable gear mechanism for converting rotary motion into linear motion according to claim 1, wherein said input guide means comprises a pivotally mounted sliding element positioned against said first end of said swivel arm for pulling said swivel arm.

6. A continuously variable gear mechanism for converting rotary motion into linear motion according to claim 1, wherein said output guide means comprises a slide and a guide member, said slide being mounted for linear movement along said guide member, and further including an elongated flexible member connected to said slide for movement in response to said slide, and wherein said output guide means produces straight line motion in response to movement of said first swivel arm end.

7. A continuously variable gear mechanism for converting rotary motion into linear motion according to claim 1, wherein said changing means comprises a slot formed in said swivel arm, one of said input guide means and said output guide means being disposed in said slot for movement toward and away from said fulcrum.

8. A continuously variable gear mechanism for converting rotary motion into linear motion according to claim 1, wherein said input guide means comprises a slide member and a slot formed in said swivel arm, said slide member being disposed in said slot and further including means for adjusting the position of said slide member relative to said fulcrum.

9. A continuously variable gear mechanism for converting rotary motion into linear motion according to claim 8, wherein said adjusting means comprises a positioning rail, said slide member being mounted for movement along said positioning rail.

10. A continuously variable gear mechanism for converting rotary motion into linear motion according to claim 9, including means for locking said slide member against movement along said positioning rail.

11. A continuously variable gear mechanism for converting rotary motion into linear motion according to claim 10, wherein said locking means comprises a spring mounted to exert pressure against said positioning rail.

12. A continuously variable gear mechanism for converting rotary motion into linear motion according to claim 2, including stop means for limiting the motion of said slide member, and means for adjusting the position of said stop means on said guide member.

13. A continuously variable gear mechanism for converting rotary motion into linear motion according to claim 6, wherein said input guide means and said output guide means each comprise a slot formed in said swivel arm, said slots being on opposite sides of said fulcrum, and a bearing surface disposed in each slot.

14. A continuously variable gear mechanism for converting rotary motion into linear motion dependent on the angle of rotation, comprising:
    means for converting rotary motion into a straight line motion;
    means for changing the stroke of said straight line motion comprising a fixed fulcrum, a swivel arm connected to pivot about said fulcrum, said fulcrum dividing said swivel arm into two lever arms of different lengths, each lever arm having an end, a first one of said ends being an input end, the second of said ends being an output end, input guide means connected to said first end for moving said first end in response to said straight line motion, whereby said swivel arm pivots about said fulcrum, and output guide means connected to said second end for moving said second end and producing said straight line motion; and means for changing the distance on said swivel arm between said input guide means and said output guide means.

* * * * *